(12) United States Patent
Kokku et al.

(10) Patent No.: US 8,688,520 B2
(45) Date of Patent: Apr. 1, 2014

(54) OPPORTUNISTIC ALIGNMENT OF ADVERTISEMENT DELIVERY WITH CELLULAR BASESTATION OVERLOADS

(75) Inventors: Ravindranath Kokku, Hyderabad (IN); Rajesh Mahindra, Highland Park, NJ (US); Honghai Zhang, Ewing, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/315,959

(22) Filed: Dec. 9, 2011

(65) Prior Publication Data

US 2012/0150597 A1 Jun. 14, 2012

Related U.S. Application Data

(60) Provisional application No. 61/421,394, filed on Dec. 9, 2010.

(51) Int. Cl.
*G06Q 30/00* (2012.01)
(52) U.S. Cl.
USPC .................................................. 705/14.59
(58) Field of Classification Search
USPC .............................................. 455/33.2, 522
See application file for complete search history.

(56) References Cited

U.S. PATENT DOCUMENTS

| 5,241,685 A * | 8/1993 | Bodin et al. ............... 455/453 |
| 2002/0025826 A1 * | 2/2002 | Aaltonen et al. ............ 455/522 |

* cited by examiner

*Primary Examiner* — Affaf Ahmed Osman Bilal Ahmed
(74) *Attorney, Agent, or Firm* — Joseph Kolodka

(57) ABSTRACT

A method includes controlling communications by users across a network with a predetermined capacity for desired communication flows for all the users and opportunistically aligning advertisement delivery to the users when an overload condition in the network occurs so that users perceive the disruption in communication service by the network as a minimum.

5 Claims, 3 Drawing Sheets

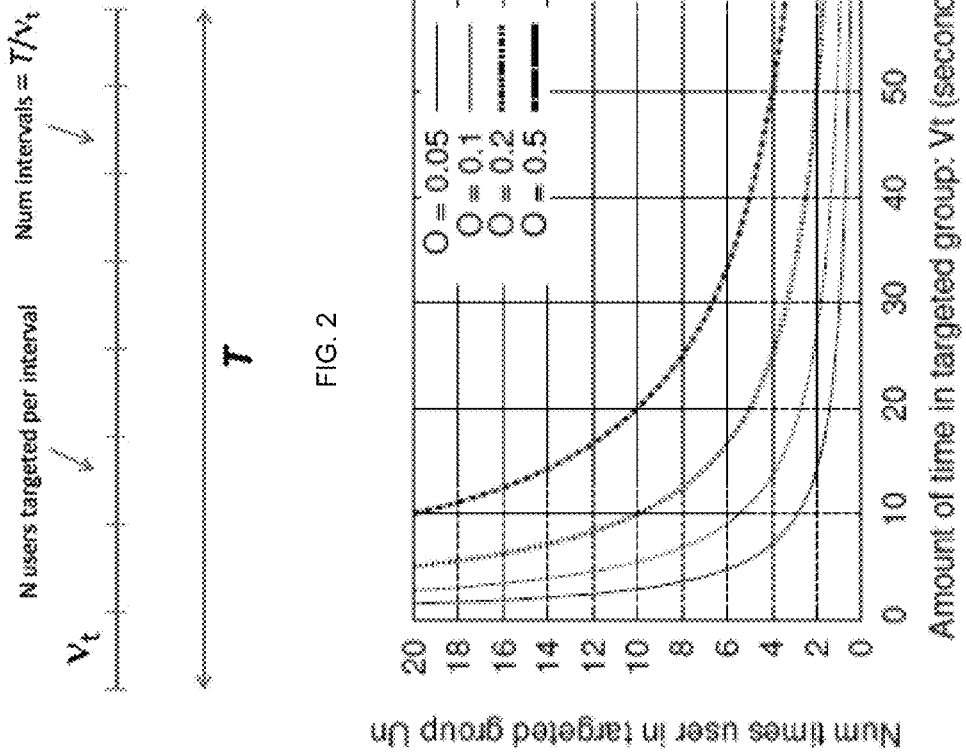
FIG. 2
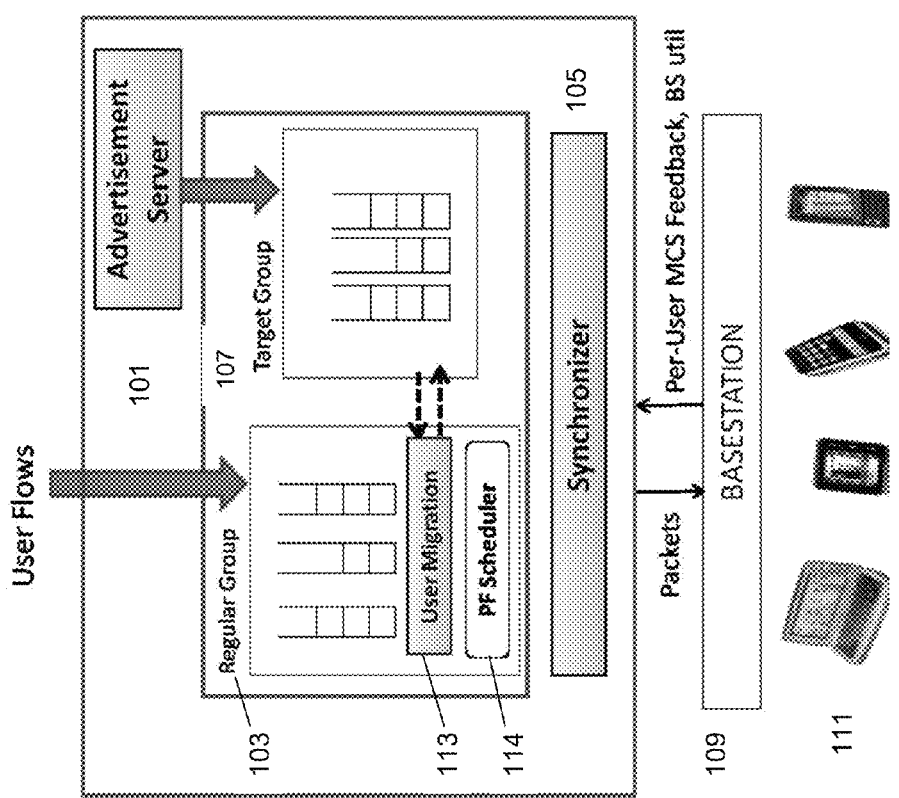
FIG. 3
FIG. 1

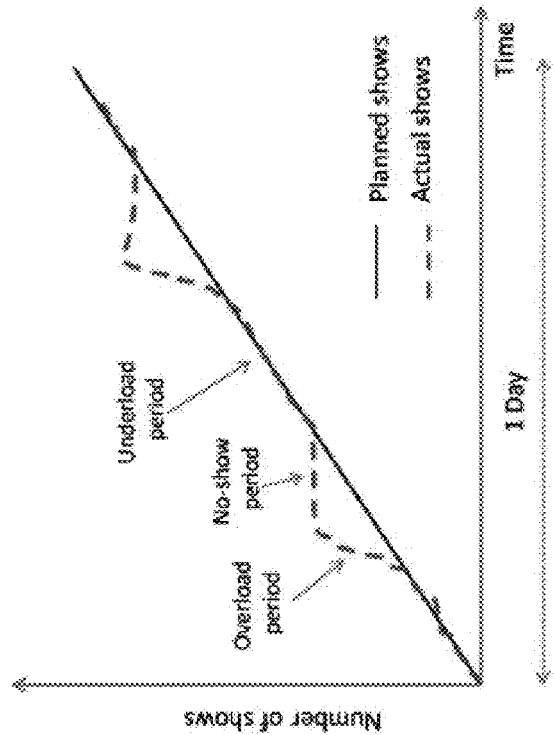

FIG. 4

*Algorithm 1* Migration
1: Every $\delta$ units of time
2: if (any user $j$ with svcRate $< \lambda_j$ && $(q|eo_j > R_j)$) then
3:  Among the unmarked users, migrate $k$ users with least $z_j$ into the target group such that $\sum_{k \text{ users}} \lambda_j \geq 0.1 \times OC$. Mark the $k$ selected users and increment $c_j$
4:  if no more unmarked active users left then
5:   unmark all users
6:  end if
7: end if

*Algorithm 2* ad_sched_overload (User U)
1: while (time in target group $< \mathcal{V}_t$) do
2:  Ad ← random entry from adlist
3:  sched (U, Ad)
4: end while
5: Move U to regular group

*Algorithm 3* ad_sched_underload
1: while (exists Ad with shows below $S_{ad}$) do
2:  U ← random entry from active users
3:  Ad ← Ad with minimum shows
4:  sched (U, Ad)
5: end while

FIG. 5

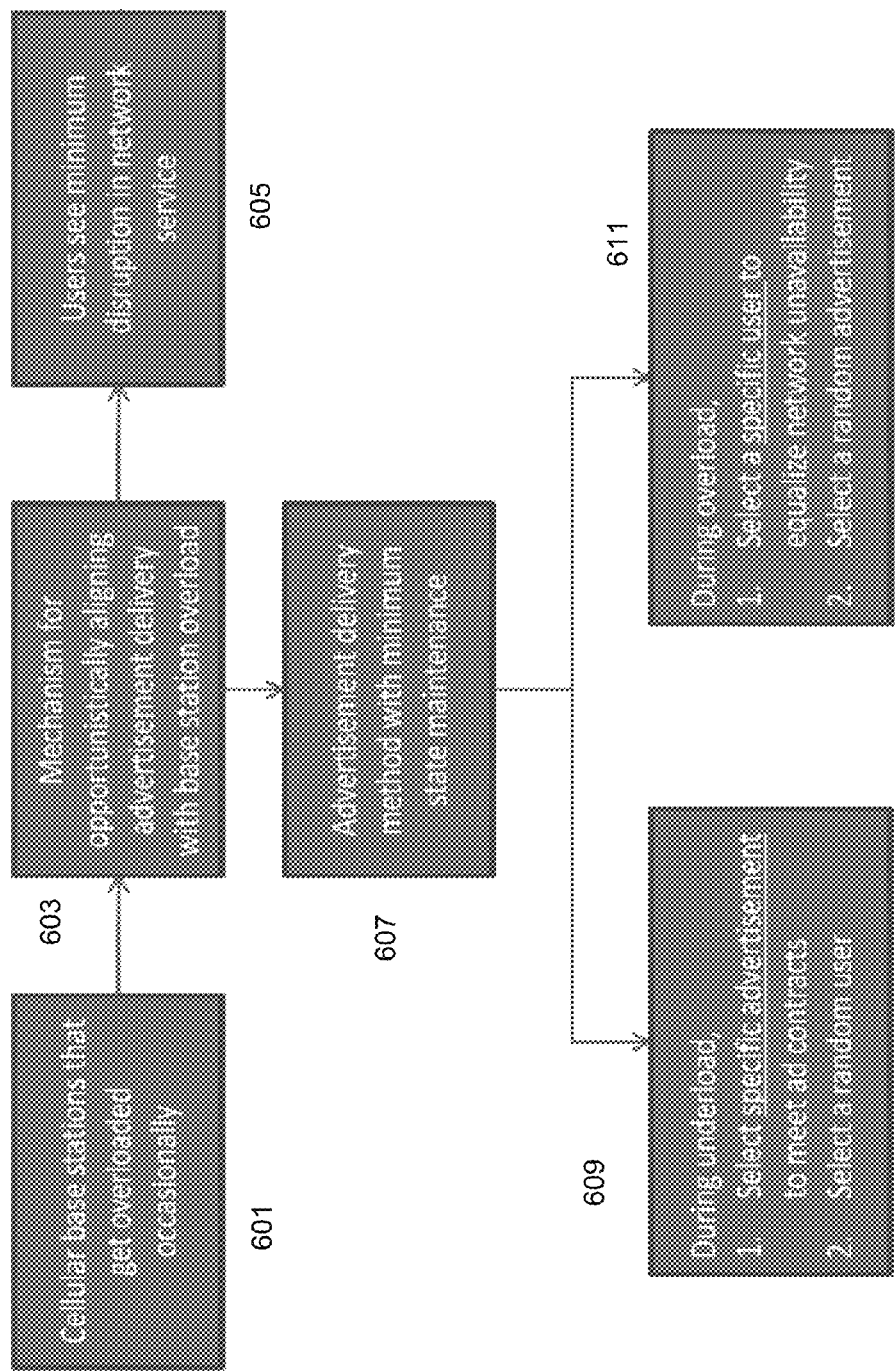

OPPORTUNISTIC ALIGNMENT OF ADVERTISEMENT DELIVERY WITH CELLULAR BASESTATION OVERLOADS

This application claims the benefit of U.S. Provisional Application No. 61/421,394, entitled, "OPPORTUNISTIC ALIGNMENT OF ADVERTISEMENT DELIVERY WITH CELLULAR BASESTATION OVERLOADS", filed Dec. 9, 2010, of which the contents are incorporated herein by reference.

BACKGROUND OF THE INVENTION

The present invention relates generally to cellular basestations and more particularly to opportunistic alignment of advertising delivery with cellular basestation overloads.

Two observations are true today in the cellular network domain: (1) cellular network operators are actively exploring advertisement delivery as a new means of revenue generation, and (2) cellular base stations perceive intermittent overloads at different times of day. Base station overloads cause interruption of network service to users. Service interruption, especially during overloads creates a bad impression of the network for users.

One method of advertisement delivery during basestation overload period uses permission based advertisement delivery, in which the users explicitly consent to receiving advertisements. They do not deal with basestation overloads.

The only way to address the effect of basestation overloads is to increase the network provisioning, which can be prohibitively expensive. Use of Traffic offload to WiFi networks and Femtocells are being explored actively now. However, none of the current network overload management techniques use alignment of advertising display with network overload to improve overall perception of network availability for users.

BRIEF SUMMARY OF THE INVENTION

The invention is directed to a method that includes controlling communications by users across a network with a predetermined capacity for desired communication flows for all the users and opportunistically aligning advertisement delivery to at least one of the users responsive to an overload condition in the network so that disruption in communication service by the network is perceived by the at least one user as being less than if there were no advertisement delivery. The overload condition occurring when the communications across said network being less than said predetermined capacity.

These and other advantages of the invention will be apparent to those of ordinary skill in the art by reference to the following detailed description and the accompanying drawings.

BRIEF DESCRIPTION OF THE DRAWINGS

FIG. 1 is an exemplary architecture for implementing the inventive method of opportunistic advertisement display with network overloads;

FIG. 2 depicts the number of migrants with the inventive method;

FIG. 3 depicts the tradeoff between amount of time in targeted group of users versus number of times users in targeted group;

FIG. 4 depicts advertising scheduling, in accordance with the invention;

FIG. 5 shows exemplary steps for migration of users (Algorithm 1), advertising scheduling for network overload (Algorithm 2), and advertising scheduling for network underload (Algorithm 3), in accordance with the invention; and FIG. 6 is a diagram of aspects of the inventive opportunistic advertising with network overloads.

DETAILED DESCRIPTION

The present invention is directed to a method for opportunistically aligning advertisement delivery with base station overloads. Such alignment improves the overall perception of network availability for users, since users do not perceive complete network unavailability at all—whenever network "needs to be unavailable" to a user, an advertisement is served.

The inventive technique considers two groups of users: regular users that receive their reserved traffic share, and targeted users that receive advertisements during basestation 109 overloads. The invention initially maps all users to the regular group, and employs proportional fair resource allocation (using the modulation and coding scheme, i.e. MCS feedback periodically from the base station) across the users. The invention employs per-user queues, and monitors the service rate and the queue length for each user. If a user's queue builds up beyond a threshold and the service rate for the user is below a threshold, some active users with minimum value of dissatisfaction are migrated to the targeted group such that the remaining flows receive adequate service rate (See Algorithm 1 in FIG. 5). Dissatisfaction is maintained as the number of times a user is moved into the target group in a given time period.

More specifically now, referring to FIGS. 1-5, the inventive opportunistic alignment of advertising delivery with cellular basestation overloads is instantiated as a gateway-level solution in the cellular operator's access network external to the basestations 109 that communicate with mobile devices 111. Since the gateway will typically handle traffic for multiple basestations, it hosts multiple inventive instances, each handling traffic for one basestation. In what follows, we begin with a discussion of service level agreements (SLAs) between the user and the network operator, and the network operator and the advertisement agency that wishes to advertise over the operator's network. We then describe an exemplary architecture for overload management, and an advertisement scheduling approach to meet the different service level agreements.

The invention considers that each user j is provided a minimum reserved downlink bandwidth $\tilde{\lambda}_j$, which is set based on contracts (data plans) between users and the network operator. Observe that the wireless resource usage (such as MAC resource slots) for achieving a given bandwidth varies with the MCS (modulation and coding scheme) for a user. Hence, to avoid getting penalized by users with bad channel quality, the mobile network operator may actually sign a contract with a user j to provide a contingent minimum reserved bandwidth as follows: The MNO defines $\tilde{R}_j^{e\!f\!f}$ as the effective bitrate above which the network provides the minimum reserved bandwidth of $\tilde{\lambda}_j$. Then, if $R_j^{e\!f\!f}$ is the instantaneous effective bitrate during system operation, the adjusted reserved bandwidth $\lambda_j$ is defined as $$\lambda_j = \tilde{\lambda}_j \cdot \min = \left(1, \frac{R_j^{e\!f\!f}}{\tilde{R}_j^{e\!f\!f}}\right). \quad \text{(eq. 1)}$$

The invention strives to provide at least a bandwidth of $\lambda_j$ to each user j when the basestation is overloaded.

It is assumed that the basestations provide to the gateway on which the invention is deployed, a feedback of two quantities every δ units of time—(i) the basestation utilization, and (ii) the current modulation and coding scheme (MCS) of each active user. The second quantity helps keep $\bar{\lambda}_j$ updated based on the user's changing channel conditions. Both quantities help the invention synchronize with the basestation capacity, and also identify overload conditions. This information is either already available on commercial Macrocell base stations (e.g. the NEC WiMAX basestation provides this information via the R6 interface and SNMP), or can be added easily. The basestation utilization depicts how fully the wireless channel is utilized and is defined as the ratio of the resource slots used for transmission and the total available slots in δ units of time.

Finally, the contract between an advertisement agency and a network operator includes the minimum number of times an advertisement is displayed to users over a given time period (e.g. a day). The invention attempts to meet this requirement both when the basestation is overloaded and when it is underloaded.

As noted before, the invention considers two groups of users: regular users that receive their traffic share of $\lambda_j$, and targeted users that receive advertisements during basestation 109 overloads. The invention initially maps all users to the regular group 103, and employs proportional fair 114 resource allocation (using the periodic MCS feedback from the basestation) across the users. The invention employs per-user queues, and monitors the service rate and the queue length for each user. If a user's queue builds up beyond a threshold and the service rate for the user is below $\lambda_j$, some active users with minimum value of dissatisfaction (represented by $Z_j$ for flow j) are migrated 113 to the target group 107 (See Algorithm 1 in FIG. 5). The goal of this migration approach in statement 3 in the Algorithm 1 is to discover the appropriate number of flows to be maintained in the target group such that the remaining flows receive adequate service rate. This may happen in multiple steps due to the condition in the statement 3. Every time a user is moved to the target group, $Z_j$ is incremented by 1.

The flows moved to the target group remain there for $V_t$ units of time. $V_t$ is configurable by network operators, and represents the amount of time advertisements are shown to a user at a stretch. Each user that is moved into the target group is marked (see lines 4-6 in Algorithm 1 of FIG. 5) to ensure that he will not get repeatedly selected for advertisement delivery even if he has very low $Z_j$; such a user will get selected again only after all other active users have also been shown an advertisement once. Additionally, a user is unmarked once a certain amount of time has passed (e.g. 15 minutes) after being marked, assuming that repeating an advertisement beyond this time is tolerable to the user during overload. This marking essentially achieves a notion of a round within which an active user is selected only once. The algorithm has an interesting property that if there is positive discrepancy in $Z_j$ (i.e. difference between maximum and minimum $Z_j$) among the current active users, the algorithm never increases the discrepancy in $Z_j$; the discrepancy either reduces or remains the same. In other words, the invention greedily attempts to equalize the number of advertisements seen by users.

The overload factor O is defined as the fraction of additional capacity required to satisfy users' bandwidth SLAs over the actual basestation capacity C. Then, $$O = \frac{(\sum \lambda_i - C)}{C}. \quad \text{(eq. 2)}$$

The above equation and the condition in line 3 of Algorithm 1, FIG. 5, ensures that Opal automatically discovers the appropriate number of users that should be in the regular group, even as the capacity C fluctuates. Notice that we define O in terms of the SLA agreed between the users and the network operators, and not in terms of the traffic demand of the users. We assume that each user has a finite queue in Opal, on which we employ active queue management. Specifically, if the queue size exceeds a threshold Rj, one packet out of every 10 packets is dropped. This is helpful in indicating congestion if the user has TCP flows, and is shown to work well for broadband wireless networks. If the queue size exceeds 2Rj, all subsequent packets are dropped. In one example, we set $$Rj = 0.2 * \lambda j \quad \text{(eq. 3)}$$

where it is assumed that 0.2 is the maximum possible round trip delay in seconds between a TCP source and its receiver.

Finally, a synchronizer 105 ensures that only enough number of packets are sent to the basestation 109 periodically to match with the capacity of the basestation, and hence avoid queue build up at the base station. Note that every time the basestation utilization is close to 100%, the aggregate service rate of all the users represents the basestation capacity C. The design and evaluation of a robust synchronizer that adapts to changing available capacity of the basestation is heretofore detailed in other works, and hence not discussed here. Without the synchronizer, the invention cannot detect overload effectively based on just the utilization feedback from the basestation. The synchronizer essentially attempts to disable the effect of MAC scheduler on the basestation.

There is now derived a simple analytical framework to highlight the invention's functionality better, and mainly to help a network operator configure the value of $V_t$ in an informed manner. Consider a time interval T during which the basestation is continuously overloaded. For simplicity, let all users have the same bandwidth SLA of λ. Let M be the number of users that can be supported in the regular group at an average service rate of λ, and let N be the number of users in the target group receiving advertisements at a rate of $\lambda_a$. Let G=M+N represent the total number of users. Then Equation 2 can be rewritten as $$O = \frac{G\lambda - C}{C} \Rightarrow G = \frac{(1+O)C}{\lambda} \quad \text{(eq. 4)}$$

If C is the capacity of the basestation, then $C = M\lambda + N\lambda_a = (G-N)\lambda + N\lambda_a$, which on simplifying gives $$N = \frac{G\lambda - C}{\lambda - \lambda_a}. \quad \text{(eq. 5)}$$

Substituting the value of G from equation 4, $$N = \frac{OC}{\lambda - \lambda_a}. \quad \text{(eq. 6)}$$

Now, with Opal, let $V_t$ be the time for which a user gets moved into the targeted group. Opal ensures that N users exist in the target group at any point of time, so that M users receive a service rate of λ. Hence, referring to FIG. 2, consider the duration T to be intervals of $V_t$, each accounting for N user migrations. Then, the total number of user migrations into the target group in time T is given by $$N \cdot \left(\frac{T}{V_t}\right).$$

With G active users in the system, the number of migrations per user is $$U_n = \frac{1}{G} \cdot \frac{NT}{V_t}. \quad \text{(eq. 7)}$$

Using equations 4 and 6 and simplifying, $$U_n = \frac{TO\lambda}{V_t(1+O)(\lambda-\lambda_a)}. \quad \text{(eq. 8)}$$

Hence, given a choice of $V_t$, and the basestation overload, and known values $\lambda$ and $\lambda_a$, a network operator can estimate the number of advertisements a user will be shown (See FIG. 3). Alternately, to control number of interruptions $U_n$ per user, an operator may choose to use a longer $V_t$ during higher overloads and show advertisements for a longer period of time. The graph shows that for masking off a persistent overload of 20% for a duration of 10 minutes at a basestation, it is sufficient to show 3 advertisements to each user of about 35 second duration. More importantly, the effect of increasing $V_t$ is more dramatic initially and then flattens relatively afterwards. This behavior is good because, the operator can easily strike the tradeoff by choosing an operating point $V_t$ in the region where the curve begins to flatten; this operating point, however, is different for different overload factors.

The invention schedules as many advertisements as possible during basestation overloads to the targeted users. However, if the basestation does not get overloaded enough during a day, each advertisement is shown at least a certain number of times in a given period to satisfy advertisement contracts. The issue if which advertisement should be scheduled at any instant of time has to be addressed with the objective that each advertisement is seen by as many unique users as possible for maximal coverage.

During overload, specific users are first selected by Algorithm 1, FIG. 5, based on $Z_j$ to be moved to the target group. Hence, to maximize the number of unique advertisements served to users without explicitly maintaining state, Opal selects an advertisement randomly. Algorithm 2, FIG. 5, depicts the basic idea of advertisement scheduling during basestation overload. Specifically, random selection of the advertisements avoids any synchronization between the number of advertisements and number of active users that can cause the same advertisement being repeatedly shown to a user. Further, random selection ensures that the advertisement list itself can be dynamic, i.e. advertisements can be removed and added.

During underload, specific advertisements are first selected to meet the contracts; i.e., the advertisements that have been shown below a $S_{ad}$ number of times are scheduled for delivery. Hence, to maximize the number of unique users seeing a given advertisement without maintaining state, Opal selects users randomly. Algorithm 3, FIG. 5, represents the overall idea, and FIG. 4 summarizes the advertisement scheduling behavior. During underload situation, if the number of shows for an advertisement is below $S_{ad}$, the advertisement is scheduled for delivery. Each overload period may cause greater than $S_{ad}$ number of advertisements to be shown, and hence the overload period may be followed by a no-show period when no advertisements are shown to users. The number of shows for an advertisement and $S_{ad}$ are reset periodically. Note that the only state the invention maintains is the number of times an advertisement has been shown, and not to which specific users it was shown; the user set connected to a basestation can be quite dynamic and large due to user mobility and nomadicity, depending on the location of the basestation.

From the foregoing in conjunction with the diagram of FIG. 6, for the cellular basestations that get overloaded occasionally 601 the invention opportunistically aligns advertisement delivery with the basestation overload 603 so that users see minimum disruption in network service 605. Advertisement delivery is provided with minimum state maintenance 607. During underload basestation conditions, specific advertisements are selected to meet advertisement contracts and random users are selected 609. During overload basestation conditions, specific users are selected to equalize network unavailability and reandom advertisements are selected 611.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method implemented by a computer configured to carry out the following steps of:
   controlling, by the computer, communications by users across a network with a predetermined capacity for optimum communication flows for all said users; and
   opportunistically aligning, by the computer, advertisement delivery to at least one of said users responsive to an overload condition in said network so that disruption in communication service by said network by said at least one user as being less than if there were no said advertisement delivery, said overload condition occurring when said communications across said network being less than said predetermined capacity;
   wherein said opportunistically aligning advertisement delivery comprises a migration of regular said users to targeted said users for receiving said opportunistic advertisement delivery;
   wherein said migration comprises migrating k users with the least dissatisfaction value of user j into a target group of said users such that $\Sigma k$ users $\lambda_j \geq 0.1*OC$, with $\lambda_j$ representing adjusted reserved bandwidth of user j, O representing an overload factor and C representing basestation capacity in said network.

2. The method of claim 1, wherein said communications are via a basestation and said disruption perceived by said at least one user is a minimum.

3. The method of claim 1, wherein said opportunistically aligning comprises selecting specific ones of said users for equalizing network unavailability for said users of said network.

4. The method of claim 3, wherein said opportunistically aligning comprises selecting random advertisements for said specific users.

5. The method of claim 1, wherein said opportunistically aligning further comprises selecting predetermined advertisements for displaying to random said users when said network exhibits an underload condition rather than said overload condition.

* * * * *